United States Patent [19]

Hamilton

[11] 3,999,178

[45] Dec. 21, 1976

[54] ORIENTATION RESPONSIVE ALARM SYSTEM

[76] Inventor: Stuart R. Hamilton, 3 Bent Hill Drive, Framingham, Mass. 01701

[22] Filed: July 14, 1975

[21] Appl. No.: 595,625

[52] U.S. Cl. .............................. 340/282; 340/52 H; 200/52 A; 200/61.45 R; 200/61.52

[51] Int. Cl.[2] ...................... G08B 21/00; B60Q 1/00

[58] Field of Search .............. 340/282, 52 H, 29, 2; 200/52 A, 61.45 R, 61.52, 153 A; 325/116

[56] References Cited

UNITED STATES PATENTS

| | | | |
|---|---|---|---|
| 3,564,496 | 2/1971 | Brooks et al. | 200/61.45 X |
| 3,659,265 | 4/1972 | Eversull | 200/61.52 X |
| 3,715,533 | 2/1973 | Seaton | 200/61.52 X |
| 3,761,653 | 9/1973 | Eranosian | 200/61.52 X |
| 3,763,484 | 10/1973 | Byers | 340/52 H X |
| 3,798,594 | 3/1974 | Funk | 200/61.45 X |

*Primary Examiner*—John W. Caldwell
*Assistant Examiner*—William M. Wannisky
*Attorney, Agent, or Firm*—John E. Toupal

[57] ABSTRACT

Disclosed is a boat alarm system including a sensor that provides a sensor output in response to a predetermined change in its orientation, a timer for providing an alarm signal in response to a one-quarter to one second period of uninterrupted sensor output and a means for generating an alarm in response to the alarm signal. The detected change in orientation is produced by an uninterrupted list of the boat in any direction for the required one-quarter to one second period. Also provided is an auxiliary timer that prevents the generation of the alarm in response to changes in the sensor's orientation that occur at less than a predetermined rate. Finally, a limit mechanism insures the generation of an alarm when such a condition reaches an extent that threatens swamping of the boat.

9 Claims, 6 Drawing Figures

ORIENTATION RESPONSIVE ALARM SYSTEM

BACKGROUND OF THE INVENTION

This invention relates generally to an alarm system for boats and, more particularly, to a system for providing an alarm in response to either boarding of a boat by an intruder or an extensive list that could lead to swamping of a boat.

Theft and general vandalism of moored boats have increased dramatically in recent years. Consequently, boat owners have become increasingly more conscious of the need for effective measures to combat these problems. Protective steps taken have included more extensive use of watchmen and the installation of various types of intrusion alarm systems. The use of watchmen, of course, is a practical solution only for large marinas at which a large number of boats are moored. Conventional alarm and security systems, although generally effective for the protection of large boats, are inappropriate for small boats without fully enclosed cabins, the violation of which is detected by most types of alarm systems. The unauthorized boarding of a small boat could be detected by the so-called tilt alarm, which is used to some extent on automotive vehicles. That alarm comprises a sensor that responds to a change in the vehicle's orientation by initiating an alarm signal. However, use of a tilt alarm on small boats would not be practical because of the false alarms that would result from wave-induced rocking of a floating boat.

The object of this invention, therefore, is to provide a relatively simple device that can reliably detect the unauthorized boarding of small moored boats.

SUMMARY OF THE INVENTION

The present invention is a boat alarm system including a sensor that provides a sensor output in response to a predetermined change in its orientation, a timer for providing an alarm signal in response to a one-quarter to one second period of uninterrupted sensor output and a means for generating an alarm in response to the alarm signal. The detected change in orientation is produced by an uninterrupted list of the boat in any direction for the required one-quarter to one second period. The requirement for an uninterrupted period of tilt in a given direction prevents the generation of alarms in response to the periodic rocking motion experienced by a moored boat. However, one boarding the boat will cause a list that satisfies the timing requirement and thereby results in the generation of an alarm.

An additional feature of the invention is the provision of an auxiliary timer that prevents the generation of the alarm in response to changes in the sensor's orientation that occur at less than a predetermined rate. A limit mechanism, however, counteracts the auxiliary timer to initiate an alarm in response to even a gradual listing of the boat that reaches a given absolute limit. The auxiliary timer prevents the generation of an alarm in response to the relatively harmless tilting of an open boat that would be caused by an accumulation of rain water. However, the limit mechanism insures the generation of an alarm when such a condition reaches an extent that threatens swamping of the boat.

DESCRIPTION OF THE DRAWINGS

These and other objects and features of the present invention will become more apparent upon a perusal of the following description taken in conjunction with the accompanying drawings wherein.

DESCRIPTION OF THE PREFERRED EMBODIMENT

Figure 1:
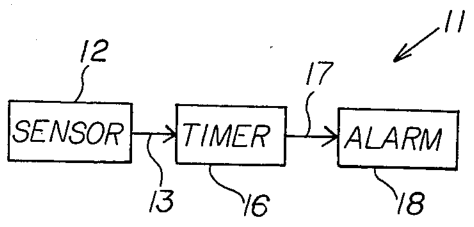
FIG. 1 is a schematic block diagram illustrating a preferred embodiment of the invention.

Referring now to FIG. 1 there is shown an alarm system 11 specifically suited for use on a small boat (not shown). The system 11 includes a sensor 12 that provides a sensor output on line 13 in response to certain conditions of orientation described in greater detail hereinafter. Receiving the sensor output on line 13 is a timer 16. In response to a continuous sensor output for a predetermined period, preferably between one-quarter and one second, the conventional timer produces on line 17 an alarm signal that activates an alarm 18 such as a horn or buzzer.

Figure 3:
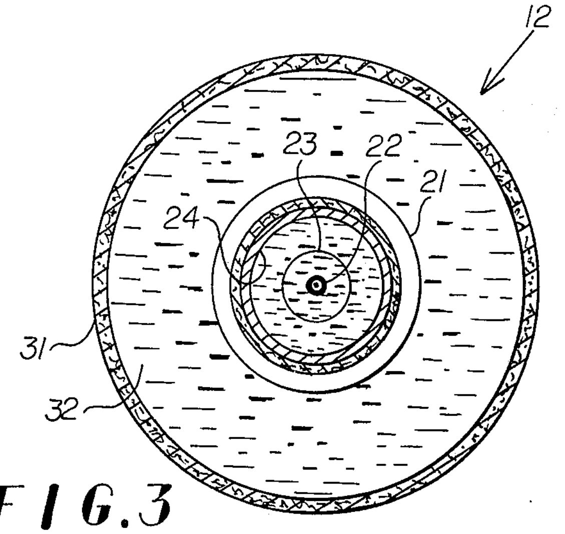
FIG. 3 is a cross-sectional view of the sensor shown in FIG. 2 taken along lines 3—3.
Figure 2:
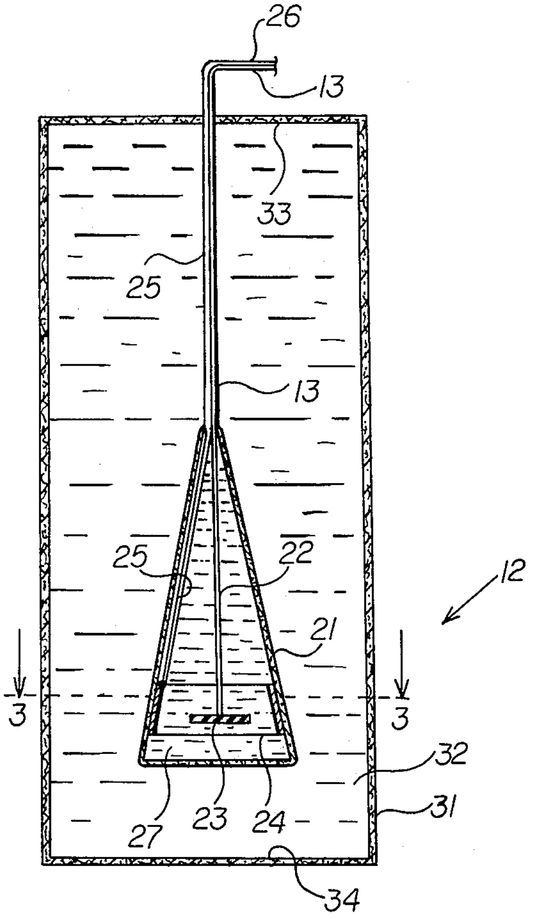
FIG. 2 is a cross-sectional, elevational view of the sensor shown in FIG. 1.

FIGS. 2 and 3 illustrate in greater detail the sensor 12 shown in FIG. 1. Supported for omni-directional pivotal movement from the apex of a conically shaped enclosure 21 is an electrically conductive pendulum member 22. A disc contact 23 is mounted on the lower end of the member 22 while a ring contact 24 extends around and is supported by the inner surface of the enclosure 21 in a position transversely adjacent to the disc contact 23. A first insulated electrical lead 25 is connected to the ring contact 24 and extends through the apex of the enclosure 21 to a voltage source 26. Similarly connected to the pendulum member 22 is a second insulated electrical lead 13 that provides an input to the timer 14 shown in FIG. 1. Filling the enclosure 21 is a relatively low viscosity, non-electrically conductive liquid 27 that slightly dampens pivotal motion of the member 22 in response to changes in the vertical orientation of the enclosure 21.

Enclosing the unit 21 is a hollow cylindrical housing 31 filled with a relatively high viscosity liquid 32 that functions as an auxiliary timer in a manner described more fully below. The unit 21 is pivotally supported within the housing 31 by the leads 13 and 25 which extend through and are sealed within a central opening in a top end wall 33. The leads 13 and 25 provide a universal type connection that permits omni-directional pivotal movement of the enclosure 21 within the housing 31.

During typical use, the system 11 is mounted on a small boat (not shown) with a bottom end wall 34 of the cylindrical housing 31 either supported by or parallel to the boat's deck. Thus, with the boat's deck in a horizontal position, the various components of the sensor 12 assume the relative positions illustrated in FIG. 2. Under those conditions the contacts 23 and 24 are separated and no signal is applied to the timer 16.

Figure 4:
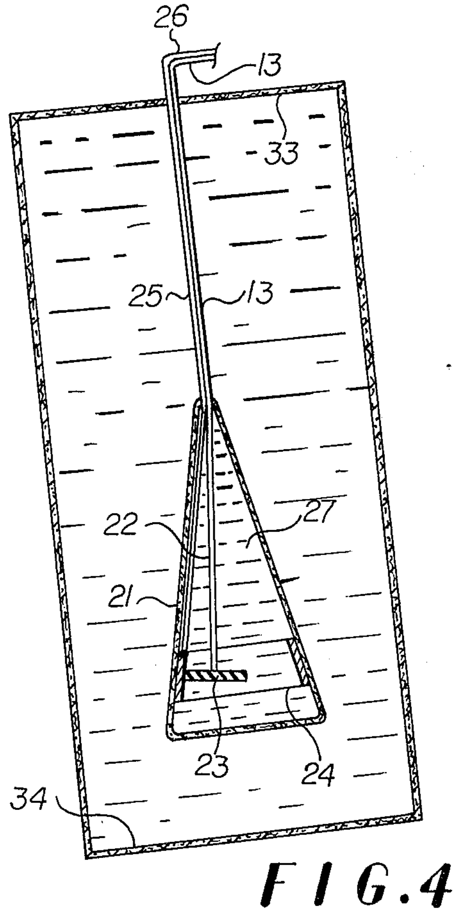
FIG. 4 is a sectional view of the sensor in another operating condition.

However, boarding of the boat by an intruder will induce a tilt of the boat's deck and accordingly of the housing 31 as shown in FIG. 4. With that orientation, the pendulum member 22 has pivoted so as to produce contact between the disc 23 and the ring contact 24 resulting in the completion of a circuit and the production on line 13 of a sensor output to the timer 16. Assuming that this output continues for the predetermined delay period established by the timer 16, an alarm signal appears on 17 to activate the alarm 18. Obviously the alarm will be produced regardless of the direction in which the tilt occurs in view of the annular configuration of the ring contact 24 and the omnidirectional movement capability of the disc contact 23. It will be noted in FIG. 4 that the enclosure 21 has not moved with respect to the housing 31 in the short delay period required by the timer 16 because of the heavy damping provided by the highly viscous liquid 32.

During wave-induced rocking motion of the boat, the components of the sensor 12 also will periodically assume the positions illustrated in FIG. 4. However, since such motion is inherently oscillatory, a boat tilt required to cause the component positions shown in FIG. 4 will be followed quickly by an opposite sense of tilt. While moving between these two diametrically opposed positions the disc contact 23 will be disengaged from the ring contact 24 to open the circuit between the source 26 and the timer 16. Under normal wave conditions this opening of the contacts 23 and 24 and the associated interruption of sensor output on line 13 will occur within the delay period required by the timer 16. Thus, no alarm signal will be provided on line 17.

Figure 5:
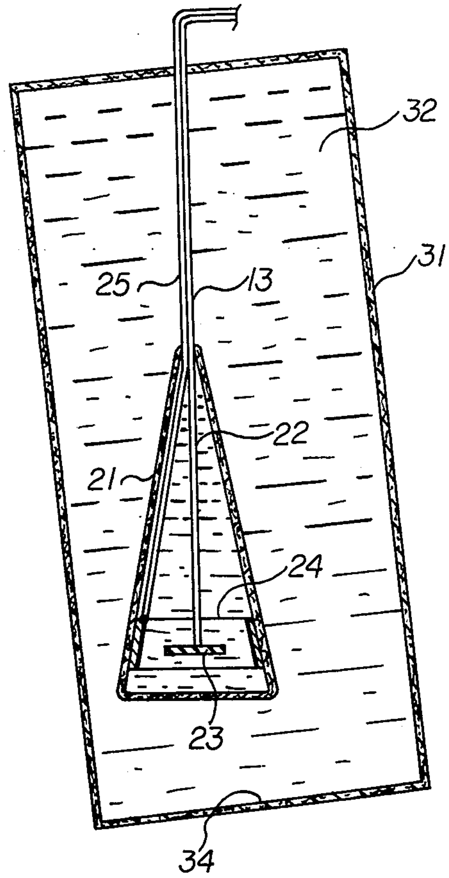
FIG. 5 is a cross-sectional view of the sensor in another operating condition.

FIG. 5 illustrates the positions of the sensor's components in response to a list of the boat having the same magnitude as that represented in FIG. 4 but occurring at a much slower rate. This condition would be caused, for example, by a gradual build up of rain water within an open boat so as to product a gradual tilting thereof. Because of the lengthy period required to reach the degree of tilt represented by the orientation of the housing 31 depicted in FIG. 5, the damping effect of the viscous liquid 32 has not prevented the enclosure 21 from remaining in its preferred vertical orientation. Thus, the pendulum member 22 has not pivoted to produce engagement between the contacts 23 and 24 and a resultant sensor output on line 13. A gradual, relatively harmless listing of the boat within reasonable predetermined limits, therefore, will not result in the generation of an alarm.

Figure 6:
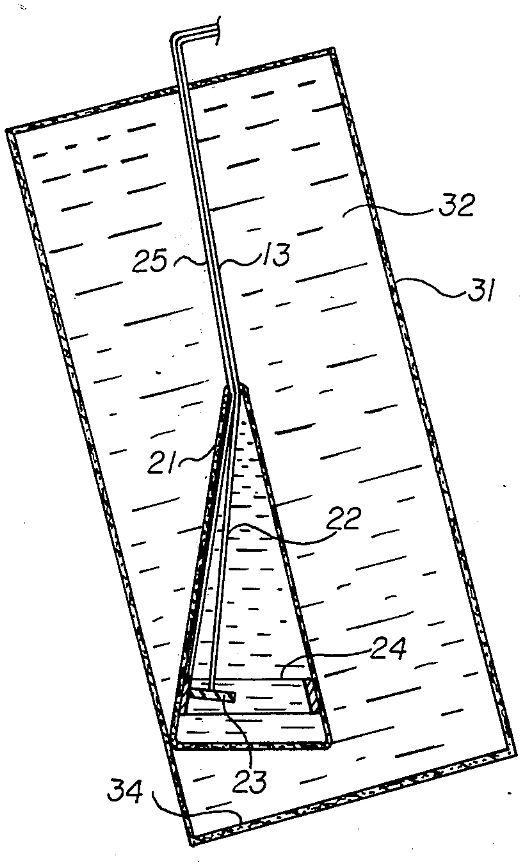
FIG. 6 is a cross-sectional view of the sensor in yet another operating condition.

FIG. 6 schematically illustrates the relative positions of the sensor's components in response to a gradual, more severe listing of the boat that could precipitate swamping thereof. This condition could be produced, for example, by a continued accumulation of bilge water in excess of that represented by the sensor positions in FIG. 5. As shown, the housing 31 has tilted to such an extent that its side walls are engaged by the conical enclosure 21. Such contact prevents the conical enclosure from remaining in its preferred vertical orientation and results in pivotal movement of the pendulum member 22 until contact is made between the disc contact 23 and the ring contact 24. Obviously, this causes a continuous sensor output on line 13, resulting in the production of an alarm signal from the timer 16. The consequent activation of the alarm 18 warns of the impending danger to the badly listing boat.

Obviously, many modifications and variations of the present invention are possible in light of the above teachings. It is to be understood, therefore, that the invention can be practiced otherwise than as specifically described.

What is claimed is:

1. An orientation responsive alarm system comprising:

support means;

sensor means mounted on said support means and for providing a sensor output in response to predetermined changes in the orientation of said support means;

timer means for providing an alarm signal in response to a predetermined period of uninterrupted sensor output;

alarm means for generating an alarm in response to said alarm signal; and auxiliary timer means for preventing the generation of said alarm in response to said predetermined changes in the orientation of said support means that occur at less than a predetermined rate.

2. A system according to claim 1 wherein said predetermined period is between one-quarter and one second.

3. A system according to claim 1 wherein said sensor means comprises omni-directional sensor means for providing said sensor output in response to changes in the orientation of said support means that exceed a preselected limit in any direction from a preselected rest orientation.

4. A system according to claim 3 wherein said sensor means comprises orientation responsive means for producing said sensor output in response to changes in the orientation of said orientation responsive means caused by said predetermined changes in the orientation of said support means.

5. A system according to claim 4 wherein said auxiliary timer means comprises compensation means for preventing said predetermined changes in the orientation of said orientation responsive means from occurring at less than a minimum rate.

6. A system according to claim 4 wherein said compensation means comprises viscous means permitting relative orientation changes between said orientation responsive means and said support means.

7. A system according to claim 6 wherein said compensation means comprises limit means for causing the provision of said alarm signal in response to changes in the orientation of said support means that exceed a preselected absolute limit from said preselected rest orientation.

8. A system according to claim 7 wherein said sensor means comprises an electrical switch having a first annular contact, a second contact spaced from said annular contact and disposed centrally thereof, and mounting means permitting relative omni-directional pivotal movement between said first and second contacts.

9. A system according to claim 8 wherein said compensation means comprises a cylindrical housing enclosing said sensor means and filled with said viscous liquid, compensation mounting means permitting relative omni-directional pivotal movement between said sensor means and said housing, and wherein said limit means comprises the inner wall surfaces of said housing.

* * * * *